(12) United States Patent
Takahashi et al.

(10) Patent No.: US 8,187,749 B2
(45) Date of Patent: May 29, 2012

(54) POSITIVE ELECTRODE FOR LITHIUM ION SECONDARY BATTERY AND LITHIUM ION SECONDARY BATTERY USING THE SAME

(75) Inventors: Keiichi Takahashi, Hyogo (JP); Kozo Watanabe, Osaka (JP); Kensuke Nakura, Osaka (JP)

(73) Assignee: Panasonic Corporation, Osaka (JP)

( * ) Notice: Subject to any disclaimer, the term of this patent is extended or adjusted under 35 U.S.C. 154(b) by 1105 days.

(21) Appl. No.: 12/052,094

(22) Filed: Mar. 20, 2008

(65) Prior Publication Data

US 2008/0233477 A1  Sep. 25, 2008

(30) Foreign Application Priority Data

Mar. 22, 2007 (JP) ................... 2007-075125

(51) Int. Cl.
*H01M 4/58* (2010.01)
(52) U.S. Cl. ............ 429/231.1; 429/233; 429/231.33; 429/223; 429/231.5; 429/231.6; 429/224
(58) Field of Classification Search ............ 429/231.1, 429/233, 231.3, 223, 231.5, 231.6, 224
See application file for complete search history.

(56) References Cited

U.S. PATENT DOCUMENTS 7,521,151 B2 * 4/2009 Hwang et al. ............ 429/209
2009/0136854 A1 * 5/2009 Nakura ............ 429/231.5

FOREIGN PATENT DOCUMENTS

| CN | 1601798 A | 3/2005 |
| JP | 8-111243 | 4/1996 |
| JP | 11-354104 | 12/1999 |
| WO | WO 2007/007541 A1 | 1/2007 |

OTHER PUBLICATIONS

Chinese Office Action, w/ English translation thereof, issued in Chinese Patent Application No. CN 200810088205.4 dated Jan. 26, 2011.

* cited by examiner

*Primary Examiner* — Laura Weiner
(74) *Attorney, Agent, or Firm* — McDermott Will & Emery LLP

(57) ABSTRACT

According to a positive electrode for a lithium ion secondary battery comprising a current collector and a mixture layer containing a transition metal-containing complex oxide as a positive electrode active material formed on the current collector, wherein the mixture layer has surface roughness of 0.1 μm or more and 0.5 μm or less in terms of a Ra value and the mixture layer has a surface treated layer treated with a coupling agent on the surface, it is possible to obtain a positive electrode which is excellent in suppression of moisture absorption. By using the positive electrode, it is possible to obtain a lithium ion secondary battery which is excellent in storage characteristics and causes less battery swelling since the amount of a gas generated upon charging and discharging decreases.

8 Claims, 3 Drawing Sheets

POSITIVE ELECTRODE FOR LITHIUM ION SECONDARY BATTERY AND LITHIUM ION SECONDARY BATTERY USING THE SAME

BACKGROUND OF THE INVENTION

1. Field of the Invention

The present invention relates to an improved positive electrode for a lithium ion secondary battery, and a lithium ion secondary battery using the same.

2. Description of the Related Art

A lithium ion secondary battery has features such as high electromotive force and high energy density, and therefore, demands as a power supply of portable equipment such as personal computers and cellular phones have recently increased. With respect to the battery applied in the above uses, it is required to use at normal temperature and simultaneously to have high energy density and excellent cycle characteristics. A novel active material with high capacity has been developed for a positive electrode and a negative electrode so as to respond to these requirements. In the positive electrode, a lithium nickelate-based material has been studied as a positive electrode active material which enables high capacity.

However, the lithium nickelate-based material has a problem that lithium hydroxide or lithium carbonate is produced as a result of moisture absorption, and thus the surface layer is likely to be deteriorated. In the lithium nickelate-based positive electrode active material in which lithium hydroxide or lithium carbonate is produced on the surface as a result of moisture absorption, gas generation may be caused by decomposition of lithium hydroxide or lithium carbonate in the battery upon the charging and discharging cycle or during storage at high temperature, resulting in deterioration of battery performances.

To cope with these problems, it is proposed to improve battery characteristics such as cycle lifetime and irreversible capacity by using an active material powder coated with a silane coupling agent. For example, Patent Document 1 (Japanese Unexamined Patent Publication (Kokai) No. 08-111243) proposes to decrease irreversible capacity by coating a positive electrode active material powder with a coupling agent, applying the coated positive electrode active material powder on a current collector, and using the resulting product as a positive electrode plate. Also, Patent Document 2 (Japanese Unexamined Patent Publication (Kokai) No. 11-354104) discloses that a lithium ion secondary battery having small irreversible capacity, higher charging and discharging efficiency and more excellent charging and discharging cycle characteristics is obtained by treating a surface of an active material with a coupling agent.

Both Patent Documents 1 and 2 propose that an active material powder is subjected to treatment by a coupling agent and a mixture paste containing the active material powder is prepared, and then the resulting mixture paste is applied on a current collector, followed by pressure bonding and further drying to obtain an electrode plate.

However, according to conventional methods, as proposed in Patent Documents 1 and 2, in which active material powder particles are coated and then, a mixture layer containing the same is processed (rolled) by applying a pressure, the lithium nickelate-based active material easily causes cracks or deformation of active material particles as a result of rolling the electrode plate, and thus an interface free from the coated coupling agent is likely to be produced, which makes it difficult to obtain sufficient effect of suppressing moisture absorption through the coating.

SUMMARY OF THE INVENTION

According to an investigation by the present inventors, even if the coating is performed after the rolling of the mixture layer, when an electrode plate having a mixture layer with large surface roughness is subjected to a coupling agent-treatment, the water repellent effect of the coupling agent is weakened and thus, satisfactory effect of suppressing moisture absorption could not be exerted on the electrode plate.

An object of the present invention which has been made under these circumstances is to provide a positive electrode for a lithium secondary battery comprising a current collector and a mixture layer containing a transition metal-containing complex oxide as a positive electrode active material formed on the current collector which is excellent in suppressing deterioration of the surface of the mixture layer due to moisture absorption, and, by using such positive electrode, to provide a lithium secondary battery which does not cause gas generation upon charging and discharging cycles and during storage at high temperature and is less likely to cause deterioration of battery performances and an increase in battery thickness.

One aspect of the present invention pertains to a positive electrode for a lithium ion secondary battery comprising a current collector and a mixture layer containing a transition metal-containing complex oxide as a positive electrode active material formed on the current collector, wherein the mixture layer has a surface roughness of 0.1 µm or more and 0.5 µm or less in terms of a Ra value and the mixture layer has a surface treated layer treated with a coupling agent on the surface.

Objects, features, aspects and advantages of the present invention become more apparent from the following detailed description and accompanying drawings.

DETAILED DESCRIPTION OF THE INVENTION

Embodiments of the present invention will now be described in detail.

The positive electrode for a lithium ion secondary battery of the present invention comprises a current collector and a mixture layer containing a transition metal-containing complex oxide as a positive electrode active material formed on the current collector, wherein the mixture layer has surface roughness of 0.1 µm or more and 0.5 µm or less in terms of a Ra value and the mixture layer has a surface treated layer treated with a coupling agent on the surface.

According to an investigation by the present inventors, it has been found that, by forming the surface treated layer using the coupling agent on the surface of the mixture layer having surface roughness of 0.1 µm or more and 0.5 µm or less in terms of a Ra value, a water repellent effect through the coupling agent is remarkably promoted, the obtained water repellent effect becoming larger as compared with the case of forming the surface treated layer using the coupling agent on the mixture layer having a surface roughness of more than 0.5 µm in terms of a Ra value. Although the reason is not necessarily clear, it is considered that the surface roughness within the above specific range of the surface of the mixture layer formed on the current collector enables to allow the coupling agent molecules to arrange in a preferable way in the surface treated layer formed on the surface of the mixture layer.

Figure 1:
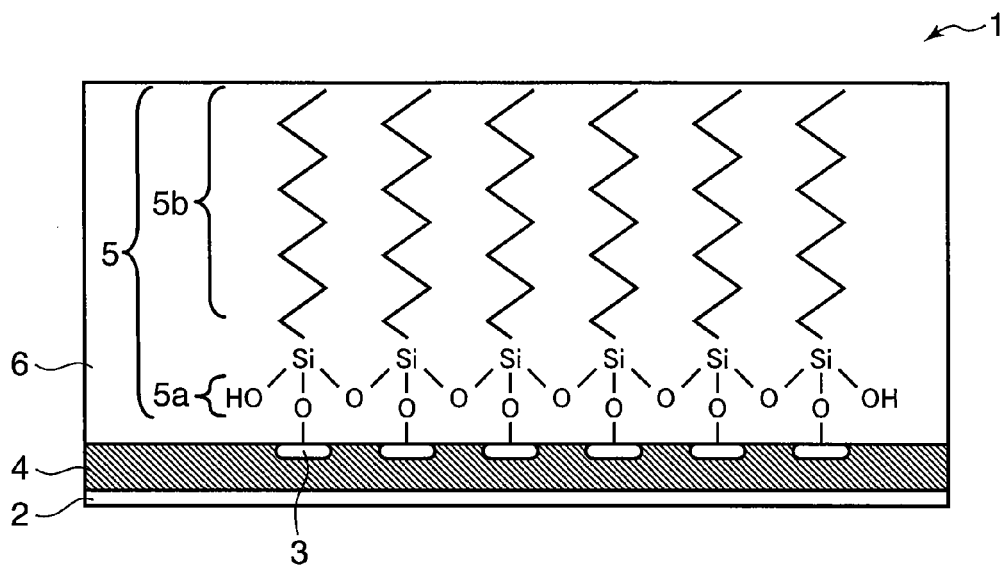
FIG. 1 is a schematic sectional view showing an example of the positive electrode for a lithium ion secondary battery according to an embodiment of the present invention.
Figure 2:
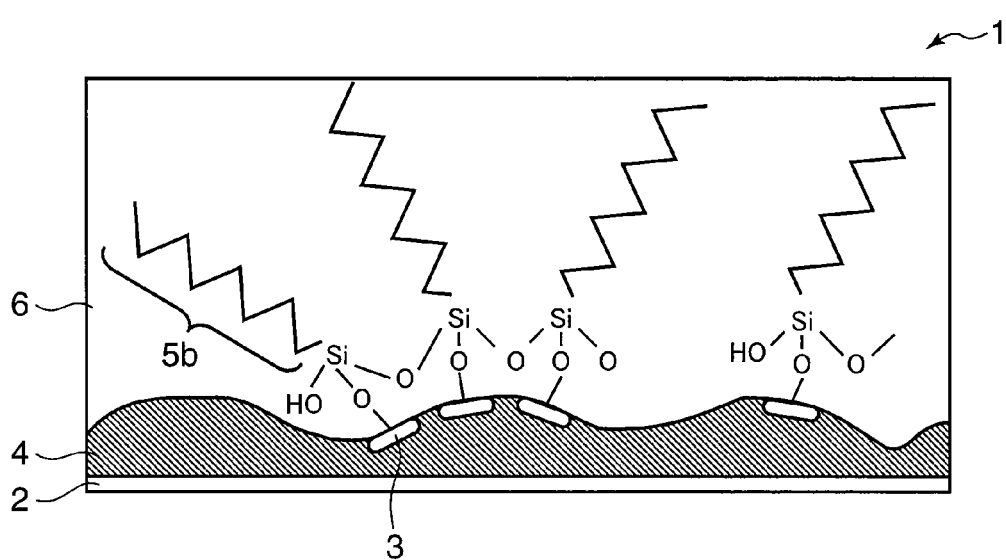
FIG. 2 is a schematic sectional view showing an example of a positive electrode in which the surface roughness of a mixture layer is more than 0.5 µm in terms of a Ra value.
Figure 3:
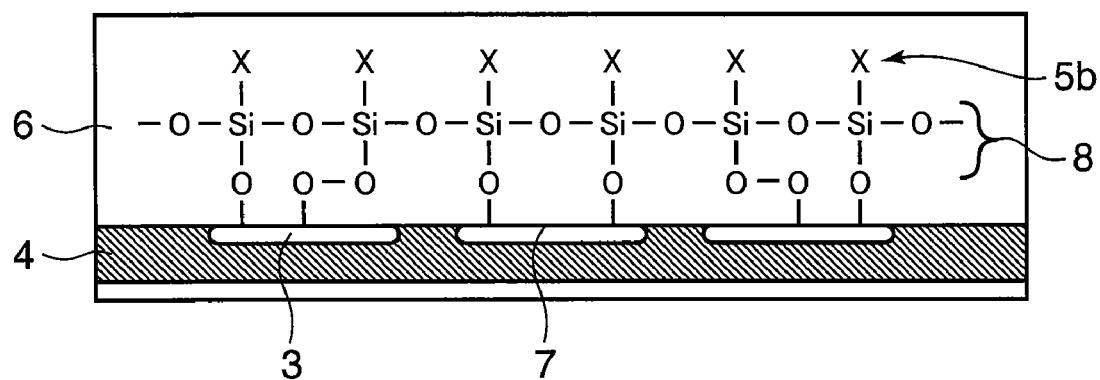
FIG. 3 is a schematic view showing an example of a state of binding of the coupling agent in the surface treated layer according to an embodiment of the present invention.

The relation between the surface roughness of the surface of the mixture layer and the arrangement of the coupling agent molecules in the surface treated layer will be described with reference to the accompanying drawings. FIGS. 1 to 3 are schematically shown so as to intelligibly explain the present invention, and the size or shape does not show an actual one.

FIG. 1 is a schematic sectional view showing an example of the positive electrode for a lithium ion secondary battery in an embodiment of the present invention. The positive electrode 1 comprises the current collector 2 and the mixture layer 4 containing the positive electrode active material 3 formed on the current collector 2, and the mixture layer 4 has a surface roughness of 0.1 µm or more and 0.5 µm or less in terms of a Ra value. The mixture layer 4 has the surface treated layer 6 treated with the coupling agent 5 on the surface. The coupling agent 5 (a silane coupling agent in FIG. 1) contained in the surface treated layer 6 has the hydrolyzable group 5a and the unsubstituted or substituted hydrocarbon group 5b in the molecule. The hydrolyzable group 5a is hydrolyzed and binds with a hydroxyl group existing on the surface of the positive electrode active material 3 contained in the mixture layer 4, while the hydrocarbon group 5b is oriented toward the side of the outer layer of the surface treated layer 6. In this case, when the surface roughness of the mixture layer 4 is in a specific range of 0.1 µm or more and 0.5 µm or less in terms of a Ra value, namely, the surface of the mixture layer 4 has uniform and small unevenness, the hydrocarbon group 5b can be oriented in a direction perpendicular to the surface of the mixture layer toward the side of the outer layer of the surface treated layer 6. It is considered that, when the hydrocarbon group 5b having water repellency is easily oriented in the direction perpendicular to the surface of the mixture layer, the water repellent effect of the surface treated layer 6 treated with the coupling agent 5 is promoted.

In contrast, as shown in the Comparative Test Examples described below, it was confirmed that the water repellent effect through the coupling agent decreases when the surface of the mixture layer has a surface roughness of more than 0.5 µm in terms of a Ra value. The reason can be explained as follows with reference to FIG. 2. FIG. 2 is a schematic sectional view showing an example of a positive electrode in which the surface roughness of the mixture layer is more than 0.5 µm in terms of a Ra value, and was prepared so as to be compared with FIG. 1 which shows an embodiment of the present invention. Similar to FIG. 1, the positive electrode in FIG. 2 comprises a current collector and a mixture layer containing a positive electrode active material formed thereon, and the mixture layer has a surface treated layer treated with a coupling agent (a silane coupling agent in FIG. 2) having a hydrolyzable group and a hydrocarbon group in the molecule on the surface. The hydrolyzable group of the coupling agent binds with the hydroxyl group existing on the surface of positive electrode active material, and thus the hydrocarbon group can be oriented toward the side of the outer layer of the surface treated layer. However, FIG. 2 is different from FIG. 1 showing the embodiment of the present invention in that the surface of the mixture layer has a surface roughness of more than 0.5 µm in terms of a Ra value. Such large unevenness on the surface of the mixture layer prevents orientation of the hydrocarbon group in a direction perpendicular to the surface of the mixture layer. Therefore, almost all of the hydrocarbon groups having water repellency are easily oriented in a horizontal direction to or at various angles to the surface of the mixture layer. As a result, the water repellent effect through the coupling agent is drastically deteriorated.

As shown in the Comparative Test Examples described below, it was confirmed even if the surface roughness of the mixture layer is less than 0.1 µm in terms of a Ra value, the water repellent effect through the coupling agent is reduced. In order to form a mixture layer having such a surface roughness, the linear pressure upon rolling must be increased. In this case, a lot of fine cracks are formed in the positive electrode active material existing on the surface of the mixture layer. It is considered that the fine cracks of the positive electrode active material increase water absorptivity of the mixture layer and, as a result, the water repellent effect through the surface treatment using the coupling agent is offset.

Ra (center line average roughness) as a parameter of the surface roughness can be calculated in conformity with JIS Standard B0601-1994. The Ra value can be determined as a value obtained by turning up a roughness curve from a center line and dividing an area obtained by the roughness curve and the center line by a length L.

The surface roughness of the mixture layer can be adjusted by forming a mixture layer containing a positive electrode active material on a current collector and by subjecting the mixture layer to a rolling treatment. For example, the rolling treatment is performed by setting the surface roughness Ra of a roller used for rolling the mixture layer to a predetermined value. Consequently, the surface roughness of the roller is transferred onto the surface of the mixture layer, enabling the surface roughness of the mixture layer to control in a range of 0.1 µm or more and 0.5 µm or less in terms of the Ra value, for example in ten-point average.

The mixture layer according to the embodiment contains a transition metal-containing complex oxide as the positive electrode active material. A form of the particles of the transition metal-containing complex oxide is not specifically limited. For example, active material particles may be formed in a state of primary particles or secondary particles. Also, a plurality of active material particles may be aggregated to form secondary particles.

The average particle diameter (the average of the secondary particle diameter when secondary particles are formed) of transition metal-containing complex oxide particles is not specifically limited, and is preferably from 3 to 30 µm, and particularly preferably from 10 to 20 µm. The average particle diameter can be measured, for example, by a wet laser particle size distribution analyzer manufactured by Microtrac Co. In this case, a 50% value (median value: D50) in a volume standard can be regarded as the average particle diameter.

As the positive electrode active material, the transition metal-containing complex oxide represented by the general formula: $Li_xM_{1-y}L_yO_2$ is preferably used. The metal M is preferably at least one metal selected from the group consisting of Ni and Co since a high-capacity active material can be obtained. In case where the lithium nickelate-based complex oxide containing Ni as a main component of M is the positive electrode active material, when the surface of the mixture layer containing the same is subjected to the treatment by the coupling agent, the water repellent effect according to the present invention can be effectively exerted on the lithium nickelate-based complex oxide of which the surface is otherwise likely to be deteriorated by moisture absorption.

In the general formula, the element L is preferably at least one element selected from the group consisting of an alkali earth element, a transition element excluding Ni and Co, a rare earth element, a Group IIIb element and a Group IVb element. It is considered that these elements exert the effect of improving thermostability on the transition metal-containing complex oxide, and also have an action of enhancing the strength of binding between the surface of the transition metal-containing complex oxide and the coupling agent. Therefore, in the transition metal-containing complex oxide, it is preferred that the element L is distributed to a more extent at the surface side of the positive electrode active material particles than the inside.

Of these elements, the element L is more preferably at least one kind selected from the group consisting of Al, Mn, Ti, Mg, Zr, Nb, Mo, W and Y. These elements can further enhance the strength of binding between the surface of the transition metal-containing complex oxide and the coupling agent. The transition metal-containing complex oxide may contain these elements alone, or two or more kinds of them. Al is particularly preferable as the element L since it has a strong force binding with oxygen. Also, Mn, Ti and Nb are preferable. When the element L contains Ca, Sr, Si, Sn or B, it is preferred to use in combination with Al, Mn, Ti or Nb.

In view of achieving high capacity, "x", which represents the content of Li, preferably satisfies the relation, $0.85 \leq x \leq 1.25$, in the completely discharged state, or in an initial state immediately after assembling of a battery, or immediately after synthesis of the lithium complex oxide. More preferably, x satisfies the relation, $0.93 \leq x \leq 1.1$.

"y", which represents the content of the element L, preferably satisfies the relation, $0 \leq y \leq 0.50$. Taking account of balances among capacity, cycle characteristics and thermostability, y preferably satisfies the relation, $0 \leq y \leq 0.50$, and more preferably the relation, $0.001 \leq y \leq 0.35$.

When the element L contains Al, assuming that "a" represents the atomic ratio of Al to the total amount of Ni, Co and the element L, "a" preferably satisfies the relation, $0.005 \leq a \leq 0.1$, and more preferably the relation, $0.01 \leq a \leq 0.05$.

When the element L contains Mn, assuming that "b" represents the atomic ratio of Mn to the total amount of Ni, Co and the element L, "b" preferably satisfies the relation, $0.005 \leq b \leq 0.5$, and more preferably the relation, $0.01 \leq b \leq 0.35$.

When the element L contains at least one selected from the group consisting of Ti and Nb, assuming that "c" is the atomic ratio of the total amount of Ti and Nb to the total amount of Ni, Co and the element L, "c" preferably satisfies the relation, $0.001 \leq c \leq 0.1$, and more preferably the relation, $0.002 \leq c \leq 0.05$.

The transition metal-containing complex oxide as the positive electrode active material can be synthesized by firing a raw material having a predetermined metal element ratio in an oxidative atmosphere. For example, in the case of synthesizing the lithium nickelate-based complex oxide in which Ni is a main component as the metal M in the above general formula, a raw material containing lithium, nickel (and cobalt) and the element L in a predetermined metal element ratio may be used. As the raw material, oxides, hydroxides, oxyhydroxides, carbonates, nitrates and organic complex salts of the respective metal elements can be used. These raw materials may be used alone, or two or more kinds may be used in combination.

In view of facilitating the synthesis of the lithium nickelate-based complex oxide, the raw material preferably includes a solid solution containing a plurality of metal elements. The solid solution containing a plurality of metal elements can be formed in any of oxides, hydroxides, oxyhydroxides, carbonates, nitrates and organic complex salts. For example, it is preferred to use a solid solution containing Ni and Co, a solid solution containing Ni and the element L, a solid solution containing Co and the element L, and a solid solution containing Ni, Co and the element L.

The temperature of firing the raw material and the oxygen partial pressure in the oxidative atmosphere vary depending on the composition and the amount of the raw material and the synthesis equipment, and persons skilled in the art can appropriately select proper conditions. Although elements other than Li, Ni, Co and the element L are sometimes contained as impurities in an amount range normally included in an industrial raw material, such impurities may be contained as long as the effects of the present invention are not adversely affected.

In the present embodiment, the surface of the mixture layer having the above surface roughness is subjected to a surface treatment using a coupling agent to form a surface treated layer.

As the coupling agent, for example, a silane coupling agent, an aluminate-based coupling agent and a titanate-based coupling agent can be preferably used. Since these coupling agents has hydrolyzable groups which are respectively binding to silicon, aluminum and titanium, and an organic functional group in the molecule, the hydrolyzable groups can chemically bind onto the surface of an inorganic material, while the organic functional group can form an organic film. Particularly, these coupling agents have high reactivity of binding with a hydroxyl group existing on the surface of the transition metal-containing complex oxide as the positive electrode active material, and thus the water repellent effect of the coupling agents can be enhanced by subjecting the surface of the mixture layer to the surface treatment. The coupling agent may be used alone, or plural kinds thereof may be used in combination. Among these coupling agents, a silane coupling agent is preferably used since the surface of the positive electrode active material can be coated with an inorganic polymer having a siloxane bond in the skeleton and thus an adverse reaction can be suppressed. For example, the surface of positive electrode active material particles can be coated with the silicone polymer by the surface treatment using the silane coupling agent.

As the coupling agent, a coupling agent having two or more hydrolyzable groups and at least one unsubstituted or substituted hydrocarbon group in the molecule can be preferably used. Examples of the hydrolyzable group include an alkoxy group such as a methoxy group or an ethoxy group; a halogen group such as a chloro group; and an isocyanate group. For example, the alkoxy group is hydrolyzed to form a hydroxyl group binding directly to an atom such as Si, Ti or Al in the coupling agent molecule (for example, Si—OH, Ti—OH, Al—OH). Since two or more hydroxyl groups are generated from two or more alkoxy groups, at least one of them allows the coupling agents to bind each other through dehydration condensation thereof to form an inorganic polymer, while at least other one of them can bind with the hydroxyl group on the surface of the positive electrode active material. In the binding with the hydroxyl group on the surface of the positive electrode active material, when the hydrolyzable group is the alkoxy group, a dealkanol reaction proceeds between the alkoxy group and the hydroxyl group. When the hydrolyzable group is the halogen group, a dehydrohalogenation reaction proceeds between the halogen group and the hydroxyl group. Taking account of reactivity with the hydroxyl group on the surface of the positive electrode active material, the hydrolyzable group is preferably the alkoxy group having 1 to 3 carbon atoms.

The unsubstituted hydrocarbon group in the coupling agent molecule is preferably a linear or branched, saturated or unsaturated, and aliphatic or alicyclic hydrocarbon group having 12 or less carbon atoms. The unsubstituted hydrocarbon group is particularly preferably a linear saturated aliphatic hydrocarbon group having 6 or less carbon atoms. Examples of the substituent in the substituted hydrocarbon group include a halogen group, a mercapto group, an alkyl group, an ether group, a cyano group, a vinyl group, and a phenyl group. Examples of preferable substituent include a halogen group, a mercapto group, and an alkyl group, which enhance water repellency of the hydrocarbon group. At least one hydrocarbon group in the coupling agent molecule is oriented toward an outer layer side of the surface treated layer formed by the surface treatment using the coupling agent, and thus water repellency of these hydrocarbon groups can exert a reliable water repellent effect on the surface treated layer.

For example, when the coupling agent is a silane coupling agent, the preferably used silane coupling agent is at least one kind selected from the silane coupling agents represented by the general formulas, $(RO)_3SiX$ and $(RO)_2SiX(Y)$ (wherein RO is the alkoxy group as the hydrolyzable group, and X and Y each independently represents the unsubstituted or substituted hydrocarbon group). A plurality of the alkoxy group is hydrolyzed into a silanol group, and both a crosslinking reaction through dehydration condensation of silanol groups and a binding reaction with a hydroxyl group on the surface of the positive electrode active material proceed simultaneously. The crosslinking reaction forms a polymer having a siloxane bond (—Si—O—) in the skeleton, and the surface of the mixture layer is coated with this polymer. Particularly, the silane coupling agent represented by the general formula: $(RO)_3SiX$ is hydrolyzed to generate three silanol groups. Therefore, the crosslinking reaction between silanol groups is likely to arise and the entire surface of the mixture layer is coated with the crosslinked polymer, and thus, the water repellent effect due to the hydrocarbon group is exerted on the entire surface treated layer treated with the silane coupling agent.

In the above silane coupling agent having the alkoxy group as the hydrolyzable group, the hydrocarbon group is preferably at least one kind selected from the group consisting of an alkyl group, a mercaptoalkyl group and a fluoroalkyl group. Particularly, these hydrocarbon groups are excellent in water repellency and also can suppress an adverse reaction with an electrolytic solution. Therefore, by orienting these hydrocarbon groups toward the outer layer side of the surface treated layer, the water repellent effect through the silane coupling agent treatment becomes more effective, and also the adverse reaction with the electrolytic solution is suppressed.

In the present embodiment, the surface treated layer is formed on the mixture layer by subjecting the surface of the mixture layer to a surface treatment using the coupling agent. The state of binding of the coupling agent in the surface treated layer will be described with reference to FIG. 3. FIG. 3 is a schematic view showing an example of the state of binding of the coupling agent in the surface treated layer according to an embodiment of the present invention. At the side of the mixture layer in the surface treated layer 6, two or more hydrolyzable groups 5a of the coupling agent 5 (a silane coupling agent in FIG. 3) are hydrolyzed, and at least one hydroxyl group thus produced binds with a hydroxyl group or an oxyhydroxyl group existing on a surface 7 of the positive electrode active material 3 contained in the mixture layer 4. At least one other hydroxyl group allows the coupling agents to bind and crosslink to each other to form an inorganic polymer 8 in the horizontal direction to the surface of the mixture layer, and the surface of the mixture layer is coated with the crosslinked polymer. At the side of the outer layer of the surface treated layer 6, the unsubstituted or substituted hydrocarbon group 5b causing water repellency of the coupling agent 5 is oriented in a direction perpendicular to the surface of the mixture layer. As a result, the strong binding with the surface of the positive electrode active material thus obtained and the inorganic polymer coating the surface of the mixture layer in the horizontal direction can exert complementarily a reliable effect of suppressing moisture absorption on the positive electrode active material, while the hydrocarbon group oriented in the direction perpendicular to the surface of the mixture layer can exert an excellent water repellent effect.

The presence or absence of the surface treated layer treated with the coupling agent can be confirmed by detecting the bond between the coupling agent and the hydroxyl group existing on the surface of the positive electrode active material. For example, when the positive electrode active material is the lithium nickelate-based complex oxide, it is possible to confirm by detecting a bond of oxide surface-O—Si, a bond of oxide surface-O—Ti, or a bond of oxide surface-O—Al on the surface. Even when the lithium nickelate-based complex oxide contains Si, Ti or Al as the element L, these elements in the lithium nickelate-based complex oxide can be differentiated from Si, Ti or Al derived from the coupling agent since the binding structure is different.

In order to make the binding between the coupling agent and the hydroxyl group or oxyhydroxyl group existing on the surface of the positive electrode active material strong, the mixture layer containing the positive electrode active material is preferably exposed in an atmospheric air under an environment of a temperature of 10 to 40° C. and humidity of 40 to 70% for a predetermined time, for example, 0.5 to 2 hours, before subjecting to the surface treatment using the coupling agent. As a result of the treatment, when the positive electrode active material is the lithium nickelate-based complex oxide, LiOH and/or NiOOH are produced on the surface of the lithium nickelate-based complex oxide. LiOH and NiOOH produced on the surface of the lithium nickelate-based complex oxide can be confirmed by XRD (powder X-ray diffraction), XPS (X-ray photoelectron spectroscopy), and SIMS (secondary ion mass spectroscopy). The hydroxide and oxyhydroxide thus produced react with the hydrolyzable group of the coupling agent to form the strong binding with the coupling agent by subjecting the mixture layer to the surface treatment using the coupling agent.

The method for the surface treatment using the coupling agent is not specifically limited. For example, the surface treatment is performed by forming the mixture layer containing the transition metal-containing complex oxide as the positive electrode active material on a current collector, subjecting the mixture layer to a rolling treatment, and then simply by immersing the resulting positive electrode plate in the coupling agent solution at a normal temperature, for example, 20 to 30° C. In view of subjecting the entire mixture layer to the surface treatment using the coupling agent, the positive electrode plate is preferably immersed and pulled up and then immediately heat-treated in a drying machine at about 100° C. so as to promote the binding between the coupling agents. The heat treatment may be performed by a method of immersing the positive electrode plate after the rolling treatment in a heated coupling agent solution. In that case, the temperature of the coupling agent solution is preferably about 50° C. or lower so as to avoid excessive coating of the surface of the positive electrode active material with the coupling agent.

The coupling agent may be directly applied on the surface of the mixture layer, or may be used after diluting with proper organic solvents, for example, ethers such as dioxane and tetrahydrofuran (THF); ketones such as acetone and methyl ethyl ketone (MEK) alcohols such as ethanol; N-methyl-2-pyrrolidone (NMP) and silicone oil.

It is preferred that an active group of the coupling agent remaining after the binding reaction through the surface treatment is sufficiently inactivated. In this case, the remaining active group can be sufficiently inactivated by immersing the positive electrode plate after the surface treatment in a solution dissolving a hydroxyl group-containing salt, a coordinating compound or a sililating agent. When the surface treatment is performed with heating as described above, this inactivation treatment may be omitted.

The amount of the coupling agent contained in the surface treated layer is preferably 2 parts by mass or less, and more preferably from 0.05 to 1.5 parts by mass, based on 100 parts by mass of the transition metal-containing complex oxide contained in the mixture layer. When the amount of the coupling agent is more than 2 parts by mass based on 100 parts by mass of the transition metal-containing complex oxide, the surface of the positive electrode active material particles is sometimes coated excessively with the coupling agent which does not contribute to the binding reaction through the surface treatment, thus adversely effecting on battery characteristics. The amount of the coupling agent contained in the surface treated layer can be determined by ICP atomic emission spectrometry.

The positive electrode in the present embodiment can be produced, for example, by the following procedure.

First, the above transition metal-containing complex oxide as the positive electrode active material is prepared. The preparation method is not specifically limited. For example, as described above, it can be prepared by firing a raw material having a predetermined metal element ratio in an oxidative atmosphere. The firing temperature and the oxygen partial pressure in the oxidative atmosphere are appropriately selected according to the composition and amount of the raw material, and the equipment for synthesis.

Next, the resulting positive electrode active material particles are dispersed in a liquid together with a conductive agent and a binder to prepare a paste of a positive electrode mixture. As the binder to be mixed in the positive electrode mixture, any of a thermoplastic resin and a thermosetting resin may be used and the thermoplastic resin is preferable. Examples of the thermoplastic resin which can be used as the binder include polyethylene, polypropylene, polytetrafluoroethylene (PTFE), polyvinylidene fluoride (PVDF), a styrene-butadiene rubber, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, an ethylene-methacrylic acid copolymer, an ethylene-methyl acrylate copolymer, and an ethylene-methyl methacrylate copolymer. These thermoplastic resins may be used alone, or two or more kinds of them may be used in combination. These thermoplastic resins may be crosslinked materials crosslinked with Na ions.

The conductive agent to be mixed in the positive electrode mixture may be an electron conductive material which is chemically stable in a battery. For example, it is possible to use graphites such as natural graphite (scaly graphite, etc.) and artificial graphite; carbon blacks such as acetylene black, Ketchen black, channel black, furnace black, lamp black, and thermal black; conductive fibers such as carbon fiber and metal fiber; metal powders such as aluminum; conductive whiskers such as zinc oxide and potassium titanate; conductive metal oxides such as titanium oxide; organic conductive materials such as polyphenylene derivative; and carbon fluoride. The conductive agent may be used alone, or two or more kinds may be used in combination. The amount of the conductive agent is not specifically limited, and is preferably 1 to 50% by mass, more preferably from 1 to 30% by mass, and particularly preferably from 2 to 15% by mass, based on the active material particles contained in the positive electrode mixture.

Next, the resulting mixture paste is applied on a current collector. The current collector may be an electron conductive material which is chemically stable in a battery. For example, a foil or sheet made of aluminum, stainless steel, nickel, titanium, carbon or a conductive resin can be used, and an aluminum foil and an aluminum alloy foil are preferable. On the surface of the foil or sheet, a layer of carbon or titanium can be formed and an oxide layer can be formed. On the surface of the foil or sheet, unevenness can also be formed, and a net, a punching sheet, a lath material, a porous material, a foam, and a molding of fibers can also be used. The thickness of the current collector is not specifically limited and is, for example, from 1 to 500 μm. The mixture paste is applied on the current collector and then dried. The drying temperature and the drying time are not specifically limited. For example, it is sufficient to dry at a temperature of 100 to 150° C. for 10 minutes.

Next, the mixture layer obtained by applying on the current collector and drying is subjected to a rolling treatment for achieving high density and flatness. The rolling treatment is performed by a method such as roller rolling so that the mixture layer is rolled to a predetermined thickness to thereby enhance a density of the positive electrode active material and filling of the space volume with the positive electrode active material. Herein, by subjecting the mixture layer to the rolling treatment after setting the surface roughness Ra of the roller used for rolling to the predetermined value, the surface roughness of the rolling roller is transferred onto the surface of the mixture layer, and thus the mixture layer having surface roughness of 0.1 μm or more and 0.5 μm or less in terms of the Ra value can be obtained.

Next, as described above, the resulting mixture layer is exposed in an atmospheric air for a predetermined time. Thus, a hydroxyl group and/or oxyhydroxyl group are produced on the surface of the positive electrode active material.

Finally, as described above, the surface treated layer can be formed on the mixture layer by subjecting the surface of the mixture layer to the surface treatment using the coupling agent.

Thus, it is possible to obtain the positive electrode of the present embodiment comprising the mixture layer which has the predetermined surface roughness and also has the surface treated layer treated using the coupling agent.

The lithium ion secondary battery of the present embodiment can be produced by using the positive electrode thus obtained, a negative electrode, and a nonaqueous electrolyte.

It is possible to use, as the negative electrode, for example, a negative electrode comprising a negative electrode current collector and a negative electrode mixture layer formed on the negative electrode current collector which contains a negative electrode active material and a binder and also contains a conductive agent and a thickener as optional components. Such a negative electrode can be produced by the similar method as that of the positive electrode.

The negative electrode active material may be a material capable of electrochemically charging and discharging lithium. For example, graphites, a non-graphitizable carbon material, a lithium alloy and metal oxide can be used. The lithium alloy is particularly preferably an alloy containing at least one selected from the group consisting of silicon, tin, aluminum, zinc and magnesium. The metal oxide is preferably an oxide containing silicon or an oxide containing tin, and is more preferably hybridized with a carbon material. The average particle diameter of the negative electrode active material is not specifically limited, and is preferably from 1 to 30 µm.

The binder to be mixed in the negative electrode mixture may be any of a thermoplastic resin and a thermosetting resin, and is preferably a thermoplastic resin. The thermoplastic resin usable as the binder can be same as that to be mixed in the positive electrode mixture. These thermoplastic resins may be used alone, or two or more kinds may be used in combination. These thermoplastic resins may be crosslinked materials crosslinked with Na ions.

The conductive agent to be mixed in the negative electrode mixture may be an electron conductive material which is chemically stable in a battery. For example, it is possible to use graphites such as natural graphite (scaly graphite, etc.) and artificial graphite; carbon blacks such as acetylene black, Ketchen black, channel black, furnace black, lamp black, and thermal black; conductive fibers such as carbon fiber and metal fiber; metal powders such as copper and nickel powders; and organic conductive materials such as polyphenylene derivatives. These conductive agents may be used alone, or two or more kinds may be used in combination. The amount of the conductive agent is not specifically limited, and is preferably from 1 to 30% by mass, and more preferably from 1 to 10% by mass, based on the active material particles contained in the negative electrode mixture.

The negative electrode current collector may be an electron conductive material which is chemically stable in a battery. For example, a foil or sheet made of stainless steel, nickel, copper, titanium, carbon, or a conductive resin can be used, and copper and a copper alloy are preferable. On the surface of the foil or sheet, a layer of carbon, titanium or nickel can be formed and an oxide layer can be formed. On the surface of the foil or sheet, unevenness can also be formed, and a net, a punching sheet, a lath material, a porous material, a foam, and a molding of fibers can also be used. The thickness of the negative electrode current collector is not specifically limited and is, for example, from 1 to 500 µm.

As the nonaqueous electrolyte, a nonaqueous electrolytic solution prepared by dissolving a lithium salt in a nonaqueous solvent can be preferably used. It is possible to use, as the nonaqueous solvent, cyclic carbonates such as ethylene carbonate (EC), propylene carbonate (PC), and butylene carbonate (BC); cyclic carbonates such as dimethyl carbonate (DMC), diethyl carbonate (DEC), ethylmethyl carbonate (EMC), and dipropyl carbonate (DPC); aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propylnitrile; nitromethane; ethylmonoglyme; phosphoric acid triester; trimethoxymethane; dioxolane derivatives; sulfolane; methylsulfolane, 1,3-dimethyl-2-imidazolidinone; 3-methyl-2-oxazolidinone; propylene carbonate derivatives; tetrahydrofuran derivatives; ethylether; 1,3-propanesultone; anisole; dimethyl sulfoxide; and N-methyl-2-pyrrolidone. These nonaqueous solvents may be used alone, or two or more kinds may be used in combination. Of these nonaqueous solvents, a mixed solvent of a cyclic carbonate and a chain carbonate, or a mixed solvent of a cyclic carbonate, a chain carbonate and an aliphatic carboxylate ester is preferable.

Examples of the lithium salt to be dissolved in the nonaqueous solvent include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylates, $LiCl$, $LiBr$, $LiI$, chloroboran lithium, lithium tetraphenylborate, and lithium imide salt. These lithium salts may be used alone, or two or more kinds may be used in combination. It is preferred to use at least $LiPF_6$. The amount of the lithium salt to be dissolved in the nonaqueous solvent is not specifically limited and the concentration of the lithium salt is preferably from 0.2 to 2 mol/L, and more preferably from 0.5 to 1.5 mol/L.

To the nonaqueous electrolytic solution, various additives can be added for the purpose of improving charging and discharging characteristics of the battery. Examples of the additive include triethyl phosphite, triethanolamine, cyclic ethers, ethylenediamine, n-glyme, pyridine, hexaphosphoric acid triamide, nitrobenzene derivatives, crown ethers, quaternary ammonium salts, and ethylene glycol dialkyl ethers.

In view of improving intermittent cycle characteristics, at least one kind selected from the group consisting of vinylene carbonate, vinylethylene carbonate, phosphazene and fluorobenzene is preferably added to the nonaqueous electrolytic solution. The content of these additives is preferably from 0.5 to 10% by mass based on the nonaqueous electrolytic solution.

A separator can be interposed between the positive electrode and the negative electrode. As the separator, for example, a microporous thin film which has large ion permeability and a predetermined mechanical strength and also has insulating properties is preferably used. The microporous thin film preferably has a function of increasing resistance by clogging pores at a given temperature or higher. It is preferred to use, as the material of the microporous thin film, a polyolefin such as polypropylene or polyethylene which is excellent in organic solvent resistance and has hydrophobicity. It is also possible to use, a sheet, a nonwoven fabric and a woven fabric which are made of glass fibers. The pore diameter of the separator is, for example, from 0.01 to 1 µm. The thickness of the separator is usually from 10 to 300 µm. Porosity of the separator is usually from 30 to 80%.

It is also possible to use a nonaqueous electrolytic solution and a polymer electrolyte composed of a polymer material, which holds the nonaqueous electrolytic solution, after integrating with a positive electrode or a negative electrode. The polymer material is not specifically limited as long as it can hold the nonaqueous electrolytic solution, and is particularly preferably a copolymer of vinylidene fluoride with hexafluoropropylene.

While the present invention has been described in connection with the preferred embodiment, such description is to be construed as being merely exemplary in nature, and it will be understood that innumerable modifications of the presently preferred embodiment are possible which nevertheless are within the scope of the present invention.

The present invention will now be described by way of examples, but the present invention is not limited to the following examples.

EXAMPLES

Example 1

Synthesis of Positive Electrode Active Material 3 kg of a mixture of nickel sulfate, cobalt sulfate and aluminum sulfate obtained by mixing so as to adjust the molar ratio of the Ni atom, the Co atom and the Al atom to 80:15:5 was dissolved in 10 L of water to obtain a raw material solution. To the raw material solution, 400 g of sodium hydroxide was added to produce a precipitate. The resulting precipitate was sufficiently washed with water and then dried to obtain a coprecipitated hydroxide.

To 3 kg of the resulting Ni—Co—Al coprecipitated hydroxide, a predetermined amount of lithium hydroxide was mixed and the mixture was fired in an atmosphere under an oxygen partial pressure of 0.5 atm at a synthesis temperature of 750° C. for 10 hours to obtain a Ni/Co-based Li complex oxide ($LiNi_{0.8}Co_{0.15}Al_{0.05}O_2$) containing Al as the element L of a transition metal-containing complex oxide.

<Production of Positive Electrode>

1 kg of the resulting positive electrode active material particles (average particle diameter: 12 μm) was stirred together with 0.5 kg of PVDF#1320 (N-methyl-2-pyrrolidone (NMP) solution having a solid content of 12% by weight) manufactured by KUREHA CORPORATION, 40 g of acetylene black and an appropriate amount of NMP using a double arm kneader to prepare a positive electrode mixture paste. The resulting paste was applied on both surfaces of a 20 μm thick aluminum foil (positive electrode current collector) and dried and then rolled thereby adjusting the total thickness to 160 μm. Simultaneously, surface roughness Ra was variously changed to produce a positive electrode plate. Specifically, the surface roughness Ra of a cemented carbide roller used upon rolling was adjusted to 0.10 μm, 0.20 μm, or 0.40 μm and then the plate was subjected to a rolling treatment. As a result, the surface roughness of the rolling roller was transferred onto the surface of the plate to obtain positive electrode plates in which each surface roughness of the mixture layer is 0.11 μm, 0.23 μm, or 0.45 μm in terms of a ten-point average of the Ra value. The resulting positive electrode plate was cut into an appropriate width to obtain three kinds of positive electrode plates, each having a different Ra value.

<Surface Treatment of Mixture Layer>

Each of the resulting positive electrode plates containing the lithium nickelate-based active material was allowed to stand under an atmosphere of a temperature of 25° C. and humidity of 55% for one hour to produce LiOH on the surface of the active material in the mixture layer. Next, the positive electrode plate containing the lithium nickelate-based active material, in which LiOH was produced on the surface, was subjected to a surface treatment using a silane coupling agent. Specifically, a heat treatment was performed by immersing the plate in a tank containing methyltrimethoxysilane (KBM-13, manufactured by Shin-Etsu Chemical Co., Ltd.) at normal temperature. Thereafter the plate was pulled up and then placed in a drying machine at 120° C. for 30 minutes.

In the surface treated layer formed by such a surface treatment, the hydrolyzable group (methoxy group) of the silane coupling agent is used for a reaction with LiOH produced on the surface of the lithium nickelate-based complex oxide or for a reaction between the coupling agents. Thus, it is considered that the unreacted hydrolyzable group to be inactivated does not remain.

It was confirmed by determining the amount of Si using ICP atomic emission spectrometry that the amount of the coupling agent in the surface treated layer is 1 part by mass based on 100 parts by mass of the lithium nickelate-based complex oxide as the positive electrode active material.

<Production of Negative Electrode>

3 kg of an artificial graphite was stirred together with 200 g of BM-400B (dispersion solution of a modified styrene-butadiene rubber having a solid content of 40% by weight) manufactured by ZEON CORPORATION, 50 g of carboxymethyl cellulose (CMC) and an appropriate amount of water using a double arm kneader to prepare a negative electrode mixture paste. The resulting paste was applied on both surfaces of a 12 μm thick copper foil (negative electrode current collector) and dried and then rolled thereby adjusting the total thickness to 160 μm. Next, the resulting plate was slitted to a width which enables insertion into a battery case, cylindrical model 18650, to obtain a negative electrode.

<Assembling of Battery>

Figure 4:
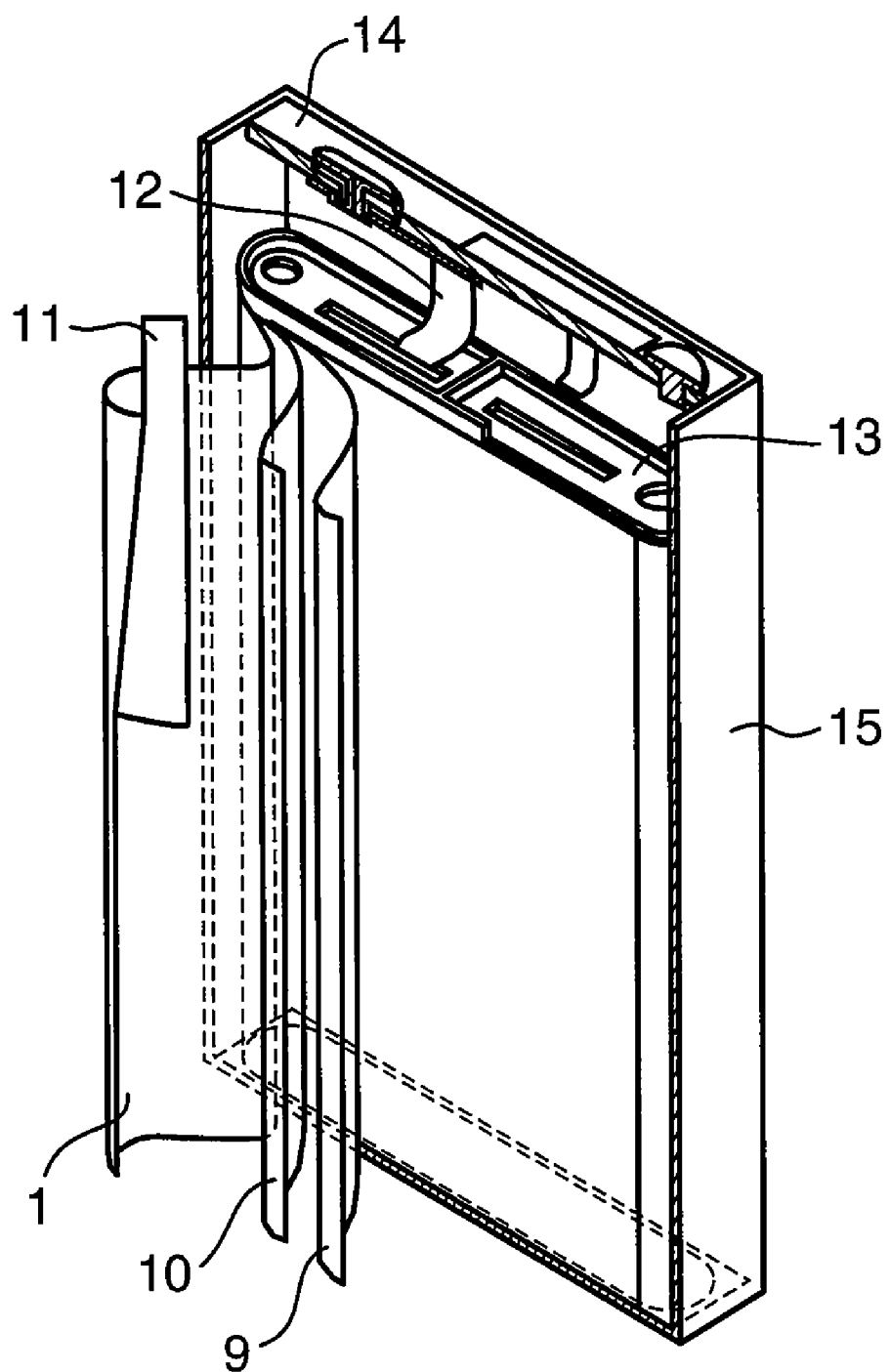
FIG. 4 is a schematic sectional view showing an example of the lithium ion secondary battery according to an embodiment of the present invention.

FIG. 4 is a schematic sectional view showing an example of a lithium ion secondary battery in an embodiment of the present invention. As shown in FIG. 4, a positive electrode 1 and a negative electrode 9 were folded through a separator 10 to form a plate assembly. As the separator 10, a composite film (2300, manufactured by Cell Guard Co., Ltd., thickness: 25 μm) of polyethylene and polypropylene was used.

Next, a sealing plate 14, around which an insulating gasket is disposed, was electrically contacted with a negative electrode lead 12, while a battery case 15 was electrically contacted with a positive electrode lead 11. Furthermore, 5 g of a nonaqueous electrolytic solution was injected in the battery case 15 and the opening portion of the case 15 was sealed with the sealing plate 14, and thus a battery was assembled.

The nonaqueous electrolytic solution used was obtained by adding 2% by weight of vinylene carbonate, 2% by weight of vinylethylene carbonate, 5% by weight of fluorobenzene and 5% by weight of phosphazene to a mixed solvent of ethylene carbonate and methylethyl carbonate in a volume ratio of 10:30 and by dissolving $LiPF_6$ in a concentration of 1.5 mol/L in the mixed solution.

Using three kinds of positive electrode plates in which each positive electrode mixture layer has a different Ra value, batteries A1, A2 and A3 were obtained.

<Evaluation of Battery>

With respect to these nonaqueous electrolyte secondary batteries, discharging characteristics were evaluated by the following procedure. Under an atmosphere of 25° C., each battery was charged at a constant current of 4.2 A (maximum current: 1 A, minimum current: 100 mA). After 30 minutes, each battery was discharged at a constant current of 200 mA up to a final voltage of 3.0 V, and then the initial capacity was determined. Also, the charging and discharging cycle was repeated 500 times under the same conditions as described above and capacity retention to the initial capacity was determined as an indicator of charging and discharging cycle characteristics. Also, a change in thickness of the battery before and after 500 charging and discharging cycles was determined.

Comparative Example 1

Two kinds of positive electrode plates, whose mixture layer have a different surface roughness, were produced by changing the surface roughness Ra of the rolling roller to 0.05 μm and 0.50 μm, respectively. The Ra values of the resulting mixture layer were 0.06 μm and 0.57 μm, respectively, in terms of a ten-point average. In the same manner as in Example 1, except that these positive electrode plates were used, a surface treatment was performed using a coupling agent (methyltrimethoxysilane) to produce batteries a1 and a2.

Furthermore, in the same manner as in batteries A1 to A3 of Example 1, except that the surface treatment was not performed using the coupling agent, batteries a3, a4 and a5 were produced using three kinds of positive electrode plates, each having a different Ra value.

The batteries A1 to A3 and batteries a1 to a5 were evaluated. The results are shown in Table 1.

TABLE 1

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| A1 | $LiNi_{0.8}Co_{0.15}Al_{0.05}O_2$ | 0.11 | Methyltrimethoxysilane | Yes (LiOH or NiOOH produced on active material surface was confirmed) | 25 | 0.99 | 3.2 | 84 |
| A2 | | 0.23 | Methyltrimethoxysilane | | | 1.2 | 3.4 | 82 |
| A3 | | 0.45 | Methyltrimethoxysilane | | | 1.1 | 3.6 | 80 |
| a1 | | 0.06 | Methyltrimethoxysilane | | | 0.97 | 5.9 | 75 |
| a2 | | 0.57 | Methyltrimethoxysilane | | | 1.2 | 6.6 | 73 |
| a3 | | 0.12 | — | | | — | 10.1 | 35 |
| a4 | | 0.22 | — | | | | 10.3 | 34 |
| a5 | | 0.46 | — | | | | 10.9 | 38 |

Example 2

In the same manner as in batteries A1 to A3 of Example 1, except that trifluoropropyltrimethoxysilane (KBM-7103, manufactured by Shin-Etsu Chemical Co., Ltd.) was used as the coupling agent in place of methyltrimethoxysilane, batteries B1 to B3 were produced. Furthermore, in the same manner as in batteries a1 and a2 of Comparative Example 1, except that the above coupling agent was used, batteries b1 and b2 were produced. These batteries were evaluated in the same manner as in Example 1. The results are shown in Table 2.

TABLE 2

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| B1 | $LiNi_{0.8}Co_{0.15}Al_{0.05}O_2$ | 0.12 | Trifluoropropyltrimethoxysilane | Yes (LiOH or NiOOH produced on active material surface was confirmed) | 25 | 1.2 | 1.8 | 89 |
| B2 | | 0.22 | Trifluoropropyltrimethoxysilane | | | 1.1 | 1.7 | 89 |
| B3 | | 0.46 | Trifluoropropyltrimethoxysilane | | | 0.99 | 2.3 | 88 |
| b1 | | 0.05 | Trifluoropropyltrimethoxysilane | | | 0.97 | 5.3 | 7.2 |
| b2 | | 0.56 | Trifluoropropyltrimethoxysilane | | | 1.4 | 5.2 | 76 |

Example 3

In the same manner as in batteries A1 to A3 of Example 1 and in the same manner as in batteries a1 and a2 of Comparative Example 1, except that dimethyldimethoxysilane (KBM-22, manufactured by Shin-Etsu Chemical Co., Ltd.) was used as the coupling agent in place of methyltrimethoxysilane, batteries C1 to C3 and batteries c1 and c2 were produced, respectively. These batteries were evaluated in the same manner as in Example 1. The results are shown in Table 3.

TABLE 3

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| C1 | LiNi$_{0.8}$Co$_{0.15}$Al$_{0.05}$O$_2$ | 0.13 | Dimethyldimethoxysilane | Yes (LiOH or NiOOH produced on active material surface was confirmed) | 25 | 1.1 | 3.2 | 81 |
| C2 | | 0.25 | Dimethyldimethoxysilane | | | 1.2 | 3.5 | 83 |
| C3 | | 0.45 | Dimethyldimethoxysilane | | | 1.3 | 3.4 | 84 |
| c1 | | 0.06 | Dimethyldimethoxysilane | | | 0.99 | 5.2 | 77 |
| c2 | | 0.56 | Dimethyldimethoxysilane | | | 1.2 | 5 | 78 |

Example 4

In the same manner as in batteries A1 to A3 of Example 1 and in the same manner as in batteries a1 and a2 of Comparative Example 1, except that methyltriethoxysilane (KBE-13, manufactured by Shin-Etsu Chemical Co., Ltd.) was used as the coupling agent in place of methyltrimethoxysilane, batteries D1 to D3 and batteries d1 and d2 were produced, respectively. These batteries were evaluated in the same manner as in Example 1. The results are shown in Table 4.

TABLE 4

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| D1 | LiNi$_{0.8}$Co$_{0.15}$Al$_{0.05}$O$_2$ | 0.13 | Methyltriethoxysilane | Yes (LiOH or NiOOH produced on active material surface was confirmed) | 25 | 0.97 | 2.4 | 88 |
| D2 | | 0.23 | Methyltriethoxysilane | | | 0.98 | 2.6 | 86 |
| D3 | | 0.43 | Methyltriethoxysilane | | | 1.2 | 2.9 | 85 |
| d1 | | 0.05 | Methyltriethoxysilane | | | 0.95 | 5.3 | 78 |
| d2 | | 0.55 | Methyltriethoxysilane | | | 1.2 | 5.4 | 78 |

Example 5

In the same manner as in batteries A1 to A3 of Example 1 and in the same manner as in batteries a1 and a2 of Comparative Example 1, except that decyltrimethoxysilane (KBM-3103, manufactured by Shin-Etsu Chemical Co., Ltd.) was used as the coupling agent in place of methyltrimethoxysilane, batteries E1 to E3 and batteries e1 and e2 were produced, respectively. These batteries were evaluated in the same manner as in Example 1. The results are shown in Table 5.

TABLE 5

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| E1 | $LiNi_{0.8}Co_{0.15}Al_{0.05}O_2$ | 0.14 | Decyltrimethoxysilane | Yes (LiOH or NiOOH produced on active material surface was confirmed) | 25 | 1.2 | 3.2 | 83 |
| E2 | | 0.26 | Decyltrimethoxysilane | | | 1.3 | 2.5 | 86 |
| E3 | | 0.43 | Decyltrimethoxysilane | | | 1.5 | 3.5 | 81 |
| e1 | | 0.07 | Decyltrimethoxysilane | | | 1 | 5.7 | 69 |
| e2 | | 0.57 | Decyltrimethoxysilane | | | 1.5 | 5.4 | 69 |

Example 6

In the same manner as in batteries A1 to A3 of Example 1 and in the same manner as in batteries a1 and a2 of Comparative Example 1, except that hexyltrimethoxysilane (KBM-3063, manufactured by Shin-Etsu Chemical Co., Ltd.) was used as the coupling agent in place of methyltrimethoxysilane, batteries F1 to F3 and batteries f1 and f2 were produced, respectively. These batteries were evaluated in the same manner as in Example 1. The results are shown in Table 6.

TABLE 6

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| F1 | $LiNi_{0.8}Co_{0.15}Al_{0.05}O_2$ | 0.15 | Hexyltrimethoxysilane | Yes (LiOH or NiOOH produced on active material surface was confirmed) | 25 | 0.95 | 3.7 | 83 |
| F2 | | 0.22 | Hexyltrimethoxysilane | | | 0.99 | 3.7 | 84 |
| F3 | | 0.43 | Hexyltrimethoxysilane | | | 0.98 | 3.8 | 83 |
| f1 | | 0.07 | Hexyltrimethoxysilane | | | 0.92 | 5.7 | 75 |
| f2 | | 0.55 | Hexyltrimethoxysilane | | | 0.99 | 6.8 | 70 |

Example 7

In the same manner as in batteries A1 to A3 of Example 1 and in the same manner as in batteries a1 and a2 of Comparative Example 1, except that hexyltriethoxysilane (KBM-3063, manufactured by Shin-Etsu Chemical Co., Ltd.) was used as the coupling agent in place of methyltrimethoxysilane, batteries G1 to G3 and batteries g1 and g2 were produced, respectively. These batteries were evaluated in the same manner as in Example 1. The results are shown in Table 7.

TABLE 7

| Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|
| G1 LiNi$_{0.8}$Co$_{0.15}$Al$_{0.05}$O$_2$ | 0.14 | Hexyltriethoxysilane | Yes (LiOH or NiOOH produced on active material surface was confirmed) | 25 | 1.2 | 3.7 | 84 |
| G2 | 0.27 | Hexyltriethoxysilane | | | 1.1 | 3.8 | 87 |
| G3 | 0.46 | Hexyltriethoxysilane | | | 1.2 | 3.7 | 86 |
| g1 | 0.08 | Hexyltriethoxysilane | | | 1 | 5.1 | 80 |
| g2 | 0.6 | Hexyltriethoxysilane | | | 1.3 | 5.9 | 79 |

Example 8

In the same manner as in batteries A1 to A3 of Example 1 and in the same manner as in batteries a1 and a2 of Comparative Example 1, except that 3-mercaptopropyltrimethoxysilane (KBM-803, manufactured by Shin-Etsu Chemical Co., Ltd.) was used as the coupling agent in place of methyltrimethoxysilane, batteries H1 to H3 and batteries h1 and h2 were produced, respectively. These batteries were evaluated in the same manner as in Example 1. The results are shown in Table 8.

Example 9

In the same manner as in batteries A1 to A3 of Example 1 and in the same manner as in batteries a1 and a2 of Comparative Example 1, except that, as a pre-treatment of the surface treatment using the coupling agent, the resulting positive electrode plate containing the lithium nickelate-based active material was not allowed to stand under an atmosphere of a temperature of 25° C. and humidity of 55%, batteries I1 to I3 and batteries i1 and i2 were produced, respectively. These

TABLE 8

| Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|
| H1 LiNi$_{0.8}$Co$_{0.15}$Al$_{0.05}$O$_2$ | 0.13 | 3-mercaptopropyltrimethoxysilane | Yes (LiOH or NiOOH produced on active material surface was confirmed) | 25 | 1.2 | 3.5 | 82 |
| H2 | 0.25 | 3-mercaptopropyltrimethoxysilane | | | 1.1 | 3.5 | 85 |
| H3 | 0.4 | 3-mercaptopropyltrimethoxysilane | | | 1.2 | 3.9 | 84 |
| h1 | 0.05 | 3-mercaptopropyltrimethoxysilane | | | 0.9 | 5 | 70 |
| h2 | 0.55 | 3-mercaptopropyltrimethoxysilane | | | 1.5 | 5.5 | 71 | batteries were evaluated in the same manner as in Example 1. The results are shown in Table 9.

In these batteries, as the pre-treatment of the surface treatment using the coupling agent, the resulting positive electrode plate containing a lithium nickelate-based active material was not allowed to stand under an atmosphere of a temperature of 25° C. and humidity of 55%, and thus the formation of LiOH or NiOOH on the surface of the active material could not be confirmed.

Example 11

In the same manner as in batteries A1 to A3 of Example 1 and in the same manner as in batteries a1 and a2 of Comparative Example 1, except that, as the method for the surface treatment using the coupling agent, a tank containing methyltrimethoxysilane (KBM-13, manufactured by Shin-Etsu Chemical Co., Ltd.) was heated to 110° C. and the positive

TABLE 9

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| I1 | $LiNi_{0.8}Co_{0.15}Al_{0.05}O_2$ | 0.12 | Methyltrimethoxysilane | No (LiOH or NiOOH produced on active material surface could not be confirmed | 25 | 0.88 | 4.5 | 78 |
| I2 | | 0.25 | Methyltrimethoxysilane | | | 0.89 | 4.2 | 79 |
| I3 | | 0.45 | Methyltrimethoxysilane | | | 0.87 | 4.2 | 78 |
| i1 | | 0.07 | Methyltrimethoxysilane | | | 0.8 | 5.9 | 69 |
| i2 | | 0.55 | Methyltrimethoxysilane | | | 0.82 | 6.2 | 68 |
| i3 | | 0.15 | — | | | — | 11 | 30 |
| i4 | | 0.22 | — | | | | 11.1 | 31 |
| i5 | | 0.45 | — | | | | 11.1 | 30 |

Example 10

In the same manner as in batteries A1 to A3 of Example 1 and in the same manner as in batteries a1 and a2 of Comparative Example 1, except that, as the method for the surface treatment using the coupling agent, a tank containing methyltrimethoxysilane (KBM-13, manufactured by Shin-Etsu Chemical Co., Ltd.) was heated to 45° C. and the positive electrode plate was immersed in the tank, batteries J1 to J3 and batteries j1 and j2 were produced, respectively. These batteries were evaluated in the same manner as in Example 1. The results are shown in Table 10.

electrode plate was immersed in the tank, batteries K1 to K3 and batteries k1 and k2 were produced, respectively. These batteries were evaluated in the same manner as in Example 1. The results are shown in Table 11.

As is apparent from Table 11, when the surface treatment was performed by immersing the positive electrode plate in the coupling agent solution heated to 110° C., the amount of the coupling agent in the surface treated layer was more than 2 parts by mass based on 100 parts by mass of the lithium nickelate-based complex oxide.

TABLE 10

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| J1 | $LiNi_{0.8}Co_{0.15}Al_{0.05}O_2$ | 0.13 | Methyltrimethoxysilane | Yes (LiOH or NiOOH produced on active material surface was confirmed) | 45 | 2 | 3.8 | 85 |
| J2 | | 0.25 | Methyltrimethoxysilane | | | 1.9 | 3.7 | 84 |
| J3 | | 0.44 | Methyltrimethoxysilane | | | 2 | 3.9 | 85 |
| j1 | | 0.07 | Methyltrimethoxysilane | | | 1.8 | 5 | 80 |
| j2 | | 0.61 | Methyltrimethoxysilane | | | 2 | 5.1 | 78 |

TABLE 11

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| K1 | LiNi$_{0.8}$Co$_{0.15}$Al$_{0.05}$O$_2$ | 0.14 | Methyltrimethoxysilane | Yes (LiOH or NiOOH produced on active material surface was confirmed) | 110 | 2.5 | 6.2 | 62 |
| K2 | | 0.25 | Methyltrimethoxysilane | | | 2.2 | 6.1 | 65 |
| K3 | | 0.44 | Methyltrimethoxysilane | | | 2.4 | 6.5 | 64 |
| k1 | | 0.08 | Methyltrimethoxysilane | | | 2.1 | 7.2 | 59 |
| k2 | | 0.57 | Methyltrimethoxysilane | | | 2.5 | 7.4 | 58 |

Example 12

In the same manner as in batteries A1 to A3 of Example 1 and in the same manner as in batteries a1 and a2 of Comparative Example 1, except that alkylacetoacetatealuminum diisopropylate (PRENACT AL-M, manufactured by AJINOMOTO CO, INC.) as an aluminate-based coupling agent was used as the coupling agent in place of methyltrimethoxysilane, batteries L1 to L3 and batteries l1 and l2 were produced, respectively. These batteries were evaluated in the same manner as in Example 1. The results are shown in Table 12.

TABLE 12

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| L1 | LiNi$_{0.8}$Co$_{0.15}$Al$_{0.05}$O$_2$ | 0.13 | Alkylacetoacetatealuminum diisopropylate | Yes (LiOH or NiOOH produced on active material surface was confirmed) | 25 | 1 | 5.5 | 72 |
| L2 | | 0.2 | Alkylacetoacetatealuminum diisopropylate | | | 1.5 | 5.7 | 71 |
| L3 | | 0.41 | Alkylacetoacetatealuminum diisopropylate | | | 1.2 | 5.8 | 72 |
| l1 | | 0.07 | Alkylacetoacetatealuminum diisopropylate | | | 1.1 | 7.1 | 68 |
| l2 | | 0.58 | Alkylacetoacetatealuminum diisopropylate | | | 1.4 | 7.9 | 65 |

Example 13

In the same manner as in batteries A1 to A3 of Example 1 and in the same manner as in batteries a1 and a2 of Comparative Example 1, except that isopropyltridodecyl benzenesulfonyltitanate (PRENACT KR 9SA, manufactured by AJINOMOTO CO, INC.) as a titanate-based coupling agent was used as the coupling agent in place of methyltrimethoxysilane, batteries M1 to M3 and batteries m1 and m2 were produced, respectively. These batteries were evaluated in the same manner as in Example 1. The results are shown in Table 13.

TABLE 13

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| M1 | LiNi$_{0.8}$Co$_{0.15}$Al$_{0.05}$O$_2$ | 0.12 | Isopropyltridodecyl benzenesulfonyltitanate | Yes (LiOH or NiOOH produced on active material surface was confirmed) | 25 | 1.1 | 5.4 | 74 |
| M2 | | 0.22 | Isopropyltridodecyl benzenesulfonyltitanate | | | 1.5 | 5.3 | 74 |
| M3 | | 0.44 | Isopropyltridodecyl benzenesulfonyltitanate | | | 1.5 | 5.4 | 72 |
| m1 | | 0.07 | Isopropyltridodecyl benzenesulfonyltitanate | | | 1.2 | 7.4 | 65 |
| m2 | | 0.55 | Isopropyltridodecyl benzenesulfonyltitanate | | | 1.4 | 7.1 | 62 |

Example 14

In the same manner as in batteries A1 to A3 of Example 1 and in the same manner as in batteries a1 and a2 of Comparative Example 1, except that 2-(3,4-epoxycyclohexyl)ethyltrimethoxysilane having an epoxy group (KBM-303, manufactured by Shin-Etsu Chemical Co., Ltd.) was used as the coupling agent, batteries N1 to N3 and batteries n1 and n2 were produced, respectively. These batteries were evaluated in the same manner as in Example 1. The results are shown in Table 14.

TABLE 14

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| N1 | LiNi$_{0.8}$Co$_{0.15}$Al$_{0.05}$O$_2$ | 0.11 | 2-(3,4-epoxycyclohexyl)ethyltrimethoxysilane | Yes (LiOH or NiOOH produced on active material surface was confirmed) | 25 | 1.1 | 5.2 | 72 |
| N2 | | 0.23 | 2-(3,4-epoxycyclohexyl)ethyltrimethoxysilane | | | 1.5 | 5.5 | 70 |
| N3 | | 0.45 | 2-(3,4-epoxycyclohexyl)ethyltrimethoxysilane | | | 1.4 | 5.6 | 69 |
| n1 | | 0.08 | 2-(3,4-epoxycyclohexyl)ethyltrimethoxysilane | | | 1.1 | 7.7 | 59 |
| n2 | | 0.57 | 2-(3,4-epoxycyclohexyl)ethyltrimethoxysilane | | | 1.4 | 7.5 | 58 |

Example 15

In the same manner as in batteries A1 to A3 of Example 1 and in the same manner as in batteries a1 to a2 of Comparative Example 1, except that hexamethyldisilazane having a Si—N bond (silazane) (HMDS3, manufactured by Shin-Etsu Chemical Co., Ltd.) was used as the coupling agent, batteries O1 to 03 and batteries o1 and o2 were produced, respectively. These batteries were evaluated in the same manner as in Example 1. The results are shown in Table 15.

TABLE 15

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| O1 | LiNi$_{0.8}$Co$_{0.15}$Al$_{0.05}$O$_2$ | 0.12 | Hexamethyldisilazane | Yes (LiOH or NiOOH produced on active material surface was confirmed) | 25 | 1 | 5.2 | 71 |
| O2 | | 0.25 | Hexamethyldisilazane | | | 1.3 | 5.5 | 72 |
| O3 | | 0.45 | Hexamethyldisilazane | | | 1.4 | 5.7 | 71 |
| o1 | | 0.07 | Hexamethyldisilazane | | | 1.2 | 7.2 | 62 |
| o2 | | 0.57 | Hexamethyldisilazane | | | 1.5 | 7.5 | 61 |

Example 16

A Ni/Co-based Li complex oxide (LiNi$_{0.8}$Co$_{0.15}$Mg$_{0.05}$O$_2$) containing Mg as the element L of a transition metal-containing complex oxide was synthesized by the following procedure.

3 kg of a mixture of nickel sulfate, cobalt sulfate and magnesium sulfate obtained by mixing so as to adjust the molar ratio of the Ni atom, the Co atom and the Mg atom to 80:15:5 was dissolved in 10 L of water to obtain a raw material solution. To the raw material solution, 400 g of sodium hydroxide was added to produce a precipitate. The resulting precipitate was sufficiently washed with water and then dried to obtain a coprecipitated hydroxide.

To 3 kg of the resulting Ni—Co—Mg coprecipitated hydroxide, a predetermined amount of lithium hydroxide was mixed and the mixture was fired in an atmosphere under an oxygen partial pressure of 0.5 atm at a synthesis temperature of 750° C. for 10 hours to obtain the Ni/Co-based Li complex oxide (LiNi$_{0.8}$CO$_{0.15}$Mg$_{0.05}$O$_2$) containing Mg as the element L of the transition metal-containing complex oxide.

In the same manner as in batteries A1 to A3 of Example 1 and in the same manner as in batteries a1 and a2 of Comparative Example 1, except that the resulting complex oxide was used as the positive electrode active material, batteries P1 to P3 and batteries p1 to p5 were produced, respectively. These batteries were evaluated in the same manner as in Example 1. The results are shown in Table 16.

Example 17

A Ni/Co-based Li complex oxide (LiNi$_{0.34}$Cu$_{0.33}$Mn$_{0.33}$O$_2$) containing Mn as the element L of a transition metal-containing complex oxide was synthesized by the following procedure.

3 kg of a mixture of nickel sulfate, cobalt sulfate and magnesium sulfate obtained by mixing so as to adjust the molar ratio of the Ni atom, the Co atom and the Mn atom to 34:33:33 was dissolved in 10 L of water to obtain a raw material solution. To the raw material solution, 400 g of sodium hydroxide was added to produce a precipitate. The resulting precipitate was sufficiently washed with water and then dried to obtain a coprecipitated hydroxide.

To 3 kg of the resulting Ni—Co—Mn coprecipitated hydroxide, a predetermined amount of lithium hydroxide was mixed and the mixture was fired in an atmosphere under an oxygen partial pressure of 0.5 atm at a synthesis temperature of 1,000° C. for 10 hours to obtain the Ni/Co-based Li complex oxide (LiNi$_{0.34}$Co$_{0.33}$Mn$_{0.33}$O$_2$) containing Mn as the element L of the transition metal-containing complex oxide.

In the same manner as in batteries A1 to A3 of Example 1 and in the same manner as in batteries a1 and a2 of Comparative Example 1, except that the resulting complex oxide was used as the positive electrode active material, batteries Q1 to Q3 and batteries q1 to q5 were produced, respectively. These batteries were evaluated in the same manner as in Example 1. The results are shown in Table 17.

TABLE 16

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| P1 | LiNi$_{0.8}$Co$_{0.15}$Mg$_{0.05}$O$_2$ | 0.11 | Methyltrimethoxysilane | Yes (LiOH or NiOOH produced on active material surface was confirmed) | 25 | 1.1 | 3.3 | 82 |
| P2 | | 0.25 | Methyltrimethoxysilane | | | 1.4 | 3.7 | 84 |
| P3 | | 0.45 | Methyltrimethoxysilane | | | 1.2 | 3.3 | 82 |
| p1 | | 0.06 | Methyltrimethoxysilane | | | 1.2 | 5.7 | 79 |
| p2 | | 0.55 | Methyltrimethoxysilane | | | 1.1 | 6.7 | 78 |
| p3 | | 0.11 | — | | | — | 10.2 | 36 |
| p4 | | 0.22 | — | | | | 10.8 | 34 |
| p5 | | 0.48 | — | | | | 10.9 | 35 |

TABLE 17

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| Q1 | LiNi$_{0.34}$Co$_{0.33}$Mn$_{0.33}$O$_2$ | 0.14 | Methyltrimethoxysilane | Yes | 25 | 1 | 3.7 | 84 |
| Q2 | | 0.25 | Methyltrimethoxysilane | (LiOH or | | 1.1 | 3.1 | 85 |
| Q3 | | 0.47 | Methyltrimethoxysilane | NiOOH | | 1.2 | 3.7 | 87 |
| q1 | | 0.09 | Methyltrimethoxysilane | produced on | | 1.1 | 5.7 | 71 |
| q2 | | 0.61 | Methyltrimethoxysilane | active | | 1.4 | 7.1 | 71 |
| q3 | | 0.11 | — | material | | — | 10.2 | 37 |
| q4 | | 0.27 | — | surface was | | | 10.3 | 37 |
| q5 | | 0.47 | — | confirmed) | | | 10 | 32 |

Example 18

A Ni/Co-based Li complex oxide (LiNi$_{0.5}$Co$_{0.5}$O$_2$) containing no element L in a transition metal-containing complex oxide was synthesized by the following procedure.

3 kg of a mixture of nickel sulfate and cobalt sulfate obtained by mixing so as to adjust the molar ratio of the Ni atom and the Co atom to 50:50 was dissolved in 10 L of water to obtain a raw material solution. To the raw material solution, 400 g of sodium hydroxide was added to produce a precipitate. The resulting precipitate was sufficiently washed with water and then dried to obtain a coprecipitated hydroxide.

To 3 kg of the resulting Ni—Co coprecipitated hydroxide, a predetermined amount of lithium hydroxide was mixed and the mixture was fired in an atmosphere under an oxygen partial pressure of 0.5 atm at a synthesis temperature of 1,000° C. for 10 hours to obtain the Ni/Co-based Li complex oxide (LiNi$_{0.5}$Co$_{0.5}$O$_2$) containing no element L.

In the same manner as in batteries A1 to A3 of Example 1 and in the same manner as in batteries a1 and a2 of Comparative Example 1, except that the resulting complex oxide was used as the positive electrode active material, batteries R1 to R3 and batteries r1 to r5 were produced, respectively. These batteries were evaluated in the same manner as in Example 1. The results are shown in Table 18.

to F3, G1 to G3, H1 to H3, I1 to I3, J1 to J3, K1 to K3, L1 to L3, M1 to M3, N1 to N3, O1 to O3, P1 to P3, Q1 to Q3, and R1 to R3 in which the positive electrode mixture layer has the surface roughness of 0.1 to 0.5 μm in terms of the Ra value and the surface of the mixture layer has the surface treated layer treated using the coupling agent, an increase in the thickness of the battery (swelling) is suppressed and also deterioration of characteristics after 500 cycles is suppressed.

In contrast, regarding batteries a1 and a2, b1 and b2, c1 and c2, d1 and d2, e1 and e2, f1 and f2, g1 and g2, h1 and h2, i1 and i2, j1 and j2, k1 and k2, l1 and l2, m1 and m2, n1 and n2, o1 and o2, p1 and p2, q1 and q2, and r1 to r2 in which the mixture layer having a surface roughness of more than 0.5 μm or less than 0.1 μm in terms of the Ra value was subjected to the surface treatment using the coupling agent, and batteries a3 to a5, i3 to i5, p3 to p5, q3 to q5, and r3 to r5 in which, although the mixture layer has the surface roughness of 0.1 to 0.5 μm in terms of the Ra value, the mixture layer was not subjected to the surface treatment using the coupling agent, the thickness of the battery drastically increases and battery characteristics drastically deteriorate.

When using the battery in which the positive electrode plate subjected to the rolling treatment so as to adjust the surface roughness of the mixture layer within a range from 0.1 to 0.5 μm was subjected to the surface treatment using the

TABLE 18

| | Positive electrode active material | Surface roughness of plate Ra (μm) | Coupling agent | Allowed to stand under atmosphere of temperature of 25° C. and humidity of 55% for one hour | Coupling agent treatment temperature (° C.) | Amount of coupling agent based on 100 parts by mass of active material (parts by mass) | Change in thickness of battery before and after storage (%) | Cycle capacity retention for 500 cycles after storage (%) |
|---|---|---|---|---|---|---|---|---|
| R1 | LiNi$_{0.5}$Co$_{0.5}$O$_2$ | 0.11 | Methyltrimethoxysilane | Yes | 25 | 1.2 | 4 | 79 |
| R2 | | 0.2 | Methyltrimethoxysilane | (LiOH or | | 1.2 | 4.2 | 78 |
| R3 | | 0.45 | Methyltrimethoxysilane | NiOOH | | 1.5 | 4.2 | 79 |
| r1 | | 0.08 | Methyltrimethoxysilane | produced on | | 1.2 | 6.1 | 68 |
| r2 | | 0.6 | Methyltrimethoxysilane | active | | 1.5 | 8.1 | 67 |
| r3 | | 0.12 | — | material | | — | 12.2 | 30 |
| r4 | | 0.25 | — | surface was | | | 12.4 | 30 |
| r5 | | 0.45 | — | confirmed) | | | 12.1 | 29 |

As is apparent from Tables 1 to 18, in each battery of batteries A1 to A3, B1 to B3, C1 to C3, D1 to D3, E1 to E3, F1 coupling agent, the water repellent effect of the coupling agent is efficiently exerted and water absorptivity of the positive electrode plate comprising the mixture layer having excellent moisture absorption resistance is suppressed. This leads to suppression of gas generation caused by hydrolysis of the electrolytic solution. As a result, a gas existing between the plate and the separator decreases and thus, cycle deterioration caused by an increase in resistance is suppressed.

Also, as is apparent from a comparison of batteries A1 to A3, P1 to P3 and Q1 to Q3 with batteries R1 to R3, batteries R1 to R3 using the transition metal-containing complex oxide containing no element L as the positive electrode active material showed the more drastic increase (swelling) in the thickness of the battery and deterioration of battery characteristics.

Furthermore, as is apparent from the results in batteries K1 to K3 and k1 and k2, battery characteristics deteriorate when the amount of the coupling agent in the surface treated layer is more than 2 parts by mass based on 100 parts by mass of the positive electrode active material.

Furthermore, as is apparent from the results in batteries I1 to I3 and i1 to i5, when the positive electrode plate is not allowed to stand under an atmosphere of a temperature of 25° C. and humidity of 55%, generation of LiOH or NiOOH on the surface of the positive electrode active material cannot be confirmed as described above, and thus, the amount of the coupling agent in the surface treated layer decreases.

Also, as is apparent from the results in batteries L1 to L3, l1 and l2, M1 to M3, m1 to m2, N1 to N3, n1 and n2, O1 to O3, and o1 and o2, when using, as the coupling agent, the aluminate-based coupling agent such as alkylacetoacetatealuminum diisopropylate or the titanate-based coupling agent such as isopropyltridodecyl benzenesulfonyltitanate, or using a silane coupling agent such as 2-(3,4-epoxycyclohexyl)ethyltrimethoxysilane having no hydrocarbon group or hexamethyldisilazane having no hydrolyzable group, the effects of suppressing an increase in the thickness of the battery (swelling) as well as deterioration of battery characteristics are reduced.

While, in the above Examples, the case of using the nickel-cobalt-aluminum complex oxide, the nickel-cobalt-magnesium complex oxide, the nickel-cobalt-manganese complex oxide, and the nickel-cobalt complex oxide as the transition metal-containing complex oxide was described, it is considered that any transition metal-containing complex oxide represented by the above general formula, $Li_xM_{1-y}L_yO_2$, has the similar crystal structure and also has similar properties as those of $LiCoO_2$ or $LiNiO_2$, and thus, the similar effects as shown in the embodiments of the present invention can be obtained also with respect to these transition metal-containing complex oxides represented by the above general formula. It has been confirmed by the present inventors that the similar results are obtained when transition metal-containing complex oxides containing Ti, Zr, Nb, Mo, W or Y are used in place of aluminum, magnesium or manganese.

As described above, one aspect of the present invention pertains to a positive electrode for a lithium ion secondary battery, comprising a current collector and a mixture layer containing a transition metal-containing complex oxide as a positive electrode active material formed on the current collector, wherein the mixture layer has a surface roughness of 0.1 μm or more and 0.5 μm or less in terms of the Ra value and the mixture layer has a surface treated layer treated with a coupling agent on the surface.

With the above constitution, since the surface of the mixture layer has uniformly small unevenness, an organic functional group having water repellency in the coupling agent molecule is easily oriented in a direction perpendicular to the surface of the mixture layer toward an outer side of the surface treated layer by subjecting the surface of the mixture layer to the surface treatment using the coupling agent, and thus, the water repellent effect of the coupling agent is promoted as compared with the case of forming a mixture layer containing an active material after subjecting the active material to a coupling agent treatment.

The positive electrode active material is preferably a transition metal-containing complex oxide represented by the general formula: $Li_xM_{1-y}L_yO_2$ (wherein x and y satisfy relations: $0.85 \leq x \leq 1.25$ and $0 \leq y \leq 0.50$; M is at least one kind metal selected from the group consisting of Ni and Co; and L is at least one element selected from the group consisting of an alkali earth element, a transition element excluding Ni and Co, a rare earth element, a Group IIIb element, and a Group IVb element.

With the above constitution, these transition metal-containing complex oxides provide a positive electrode active material having a high capacity. In addition, deterioration of the surface layer caused by moisture absorption of the positive electrode active material is effectively suppressed by the coupling agent treatment of the surface of the mixture layer containing the positive electrode active material.

Furthermore, in the above general formula, the element L is preferably at least one kind selected from the group consisting of Al, Mn, Ti, Mg, Zr, Nb, Mo, W and Y.

Since the element L has an action of enhancing the strength of binding between the transition metal-containing complex oxide contained in the mixture layer and the coupling agent, the water repellent effect through the coupling agent further increases.

The coupling agent is preferably at least one kind selected from the group consisting of a silane coupling agent, an aluminate-based coupling agent and a titanate-based coupling agent.

The water repellent effect of the coupling agent is enhanced since these coupling agents have high reactivity of binding with a hydroxyl group existing on the surface of the transition metal-containing complex oxide as the positive electrode active material.

Furthermore, the coupling agent preferably has two or more hydrolyzable groups and at least one unsubstituted or substituted hydrocarbon group in the molecule.

With the above constitution, the hydrolyzable group in the coupling agent molecule is hydrolyzed to thereby form a binding between the coupling agents and a binding with a hydroxyl group on the surface of the positive electrode active material. Simultaneously, the hydrocarbon group having water repellency can be oriented toward the outer side of the surface treated layer, and thus, a more certain water repellent effect is exerted.

The coupling agent is preferably at least one kind selected from silane coupling agents represented by the general formulas, $(RO)_3SiX$ and $(RO)_2SiX(Y)$ (wherein RO is an alkoxy group as the hydrolyzable group, and X and Y represent the unsubstituted or substituted hydrocarbon group).

With the above constitution, a plurality of alkoxy groups is hydrolyzed into silanol groups, and a crosslinking reaction through dehydration condensation between silanol groups and a binding reaction with a hydroxyl group on the surface of the positive electrode active material proceed simultaneously, enabling the silane coupling agent to exert the water repellent effect on the entire surface of the mixture layer.

Furthermore, the silane coupling agent preferably has the alkoxy group as the hydrolyzable group and has at least one kind selected from the group consisting of an alkyl group, a mercaptoalkyl group and a fluoroalkyl group as the hydrocarbon group.

With the above constitution, by orienting these hydrocarbon groups toward the outer side of the surface treated layer, not only the effect of suppressing moisture absorption through the silane coupling agent treatment becomes more effective, but also an adverse reaction with an electrolytic solution can be suppressed.

It is preferred that the surface treated layer formed on the surface of the mixture layer has a binding of the hydrolyzable group of the coupling agent with the hydroxyl group on the surface of the positive electrode active material at the side of the mixture layer, and the hydrocarbon group of the coupling agent is oriented at the side of the outer layer.

With the above constitution, the hydrocarbon group having water repellency is easily oriented in a direction perpendicular to the surface of the mixture layer toward the side of the outer layer of the surface treated layer, and thus a more reliable water repellent effect is exerted.

The surface treated layer preferably contains the coupling agent in an amount of 2 parts by mass or less based on 100 parts by mass of the transition metal-containing complex oxide.

With the above constitution, by subjecting the mixture layer to the surface treatment using the coupling agent in the amount suited for the amount of the positive electrode active material, the preferable water repellent effect can be obtained without inhibiting battery characteristics.

In the lithium ion secondary battery comprising the above positive electrode for a lithium ion secondary battery, which is excellent in the effect of suppressing moisture absorption, a negative electrode and a nonaqueous electrolyte, gas generation caused by surface deterioration during charging and discharging cycles and storage at high temperature is suppressed. As a result, deterioration of battery performances and an increase in the thickness of the battery are less likely to occur.

According to the present invention, it is possible to provide a positive electrode for a lithium ion secondary battery in which surface deterioration caused by moisture absorption is suppressed. Furthermore, by using the positive electrode, it is possible to provide a lithium ion secondary battery in which gas generation is suppressed during charging and discharging cycles and storage at high temperature, improving cycle characteristics and also suppressing an increase in the thickness of the battery (swelling).

This application is based on Japanese Patent application serial no. 2007-075125 filed in Japan Patent Office on Mar. 22, 2007, the contents of which are hereby incorporated by reference.

Although the present invention has been fully described by way of example, it is to be understood that various changes and modifications will be apparent to those skilled in the art. Therefore, unless otherwise such changes and modifications depart from the scope of the present invention hereinafter defined, they should be construed as being included therein.

What is claimed is:

1. A positive electrode for a lithium ion secondary battery, comprising a current collector and a mixture layer containing a transition metal-containing complex oxide as a positive electrode active material formed on the current collector, wherein
the mixture layer has surface roughness of 0.1 μm or more and 0.5 μm or less in terms of a Ra value,
the mixture layer has a surface treated layer treated with a coupling agent on the surface of the mixture layer, and
the coupling agent is at least one kind selected from the group consisting of a silane coupling agent, an aluminate coupling agent, and a titanate coupling agent.

2. The positive electrode for a lithium ion secondary battery according to claim 1, wherein the transition metal-containing complex oxide is represented by the general formula: $Li_xM_{1-y}O_2$, wherein x and y satisfy relations: $0.85 \leq x \leq 1.25$ and $0 \leq y \leq 0.50$: M is at least one metal selected from the group consisting of Ni and Co; and L is at least one element selected from the group consisting of Al, Mn, Ti, Mg, Zr, Nb, Mo, W, and Y.

3. The positive electrode for a lithium ion secondary battery according to claim 1, wherein the coupling agent has two or more hydrolyzable groups and at least one unsubstituted or substituted hydrocarbon group in the molecule.

4. The positive electrode for a lithium ion secondary battery according to claim 3, wherein the coupling agent is at least one kind selected from silane coupling agents represented by the general formulas: $(RO)_3SiX$ and $(RO)_2SiX(Y)$ (wherein RO is an alkoxy group as the hydrolyzable group, and X and Y represent the unsubstituted or substituted hydrocarbon group).

5. The positive electrode for a lithium ion secondary battery according to claim 4, wherein the silane coupling agent has the alkoxy group as the hydrolyzable group and has at least one kind selected from the group consisting of an alkyl group, a mercaptoalkyl group and a fluoroalkyl group as the unsubstituted or substituted hydrocarbon group.

6. The positive electrode for a lithium ion secondary battery according to claim 4, wherein the surface treated layer has a binding of the hydrolyzable group of the coupling agent with a hydroxyl group or an oxyhydroxyl group on the surface of the transition metal-containing complex oxide at the side of the mixture layer, and the unsubstituted or substituted hydrocarbon group of the coupling agent is oriented at the side of the outer layer.

7. The positive electrode for a lithium ion secondary battery according to claim 1, wherein the surface treated layer contains the coupling agent in an amount of 0.05 to 2 parts by mass based on 100 parts by mass of the transition metal-containing complex oxide.

8. A lithium ion secondary battery comprising the positive electrode for a lithium ion secondary battery according to claim 1, a negative electrode, and a nonaqueous electrolyte.

* * * * *